United States Patent [19]

Rosenitsch

[11] 4,180,244
[45] Dec. 25, 1979

[54] STOPCOCK FORMED OF SHEET METAL

[75] Inventor: Johann Rosenitsch, Vienna, Austria

[73] Assignee: Hübner-Vamag Aktiengesellschaft & Co. Kommanditgesellschaft, Vienna, Austria

[21] Appl. No.: 799,403

[22] Filed: May 23, 1977

[51] Int. Cl.² .............................................. F16K 5/06
[52] U.S. Cl. ................................. 251/309; 251/315; 251/367; 29/157.1 R; 29/412
[58] Field of Search ................ 251/309, 315, 367; 29/157.1 R, 412, 463

[56] References Cited

U.S. PATENT DOCUMENTS

| | | | |
|---|---|---|---|
| 3,367,359 | 2/1968 | Johnson | 251/315 |
| 3,425,663 | 2/1969 | Priese | 251/315 |
| 3,463,449 | 8/1969 | Nelson et al. | 251/315 |
| 3,501,128 | 3/1970 | Pool | 251/315 |
| 3,518,742 | 7/1970 | Merrill et al. | 251/315 |
| 3,678,556 | 7/1972 | Shafer | 29/412 |
| 3,712,584 | 1/1973 | Wise et al. | 251/315 |
| 3,737,145 | 6/1973 | Heller et al. | 251/309 |
| 3,841,601 | 10/1974 | Grove et al. | 251/367 |
| 3,987,529 | 10/1976 | Nakagawa et al. | 29/412 |
| 4,038,734 | 8/1977 | Goldman | 29/157.1 R |

FOREIGN PATENT DOCUMENTS 212924  12/1956  Netherlands ............................. 251/315

*Primary Examiner*—William R. Cline
*Assistant Examiner*—H. Jay Spiegel
*Attorney, Agent, or Firm*—Toren, McGeady and Stanger

[57] ABSTRACT

A stopcock with the exception of its shaft, journal and bearings, is constructed of a plurality of sheet metal parts welded together to form a housing and a plug rotatably mounted in the housing. The housing is made up of a tubular member with ring disks welded to its opposite ends. The plug is made up of ball-shaped half shells and annular disk cores welded to the half shells. A tubular plate is welded into the half shell and forms the flow passage through the stopcock.

7 Claims, 3 Drawing Figures

PLUG IN OPEN POSITION   PLUG IN CLOSED POSITION

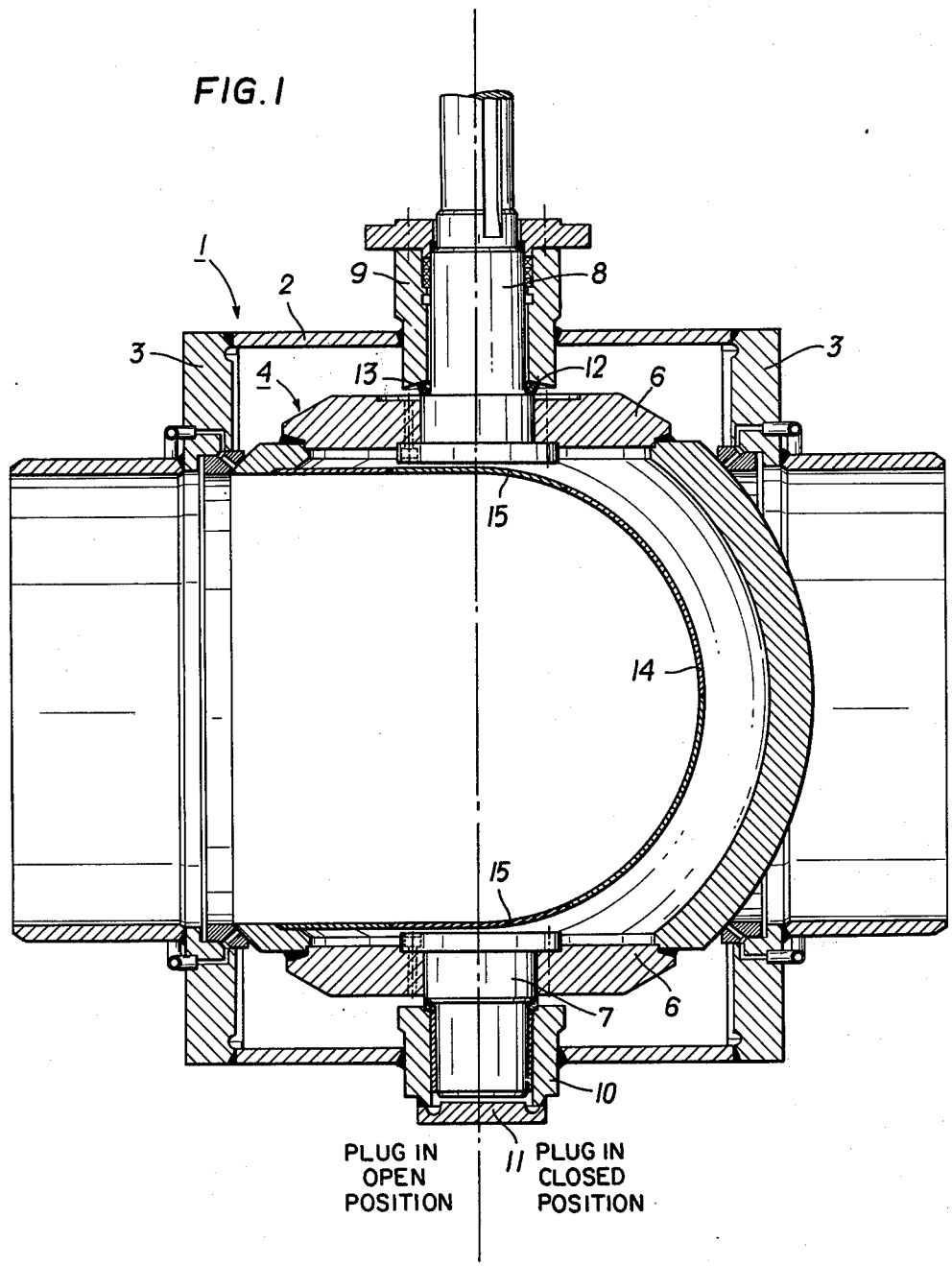

STOPCOCK FORMED OF SHEET METAL

SUMMARY OF THE INVENTION

The present invention is directed to a stopcock and, more particularly, to a stopcock where certain of its individual parts are constructed of sheet metal sections welded together.

It is the primary object of the present invention to produce a stopcock in an economical manner.

In accordance with the present invention, an economical stopcock is constructed, with the exception of its shaft, journal, bearings, and connection pipes, if necessary, of individual sheet metal parts welded together to form the housing and the plug rotatably mounted in the housing.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawing:

FIG. 1 is a sectional view through a stopcock embodying the present invention with the plug of the stopcock represented in the open position on the left hand side and in the closed position on the right hand side;

DETAILED DESCRIPTION OF THE INVENTION

Figure 3:
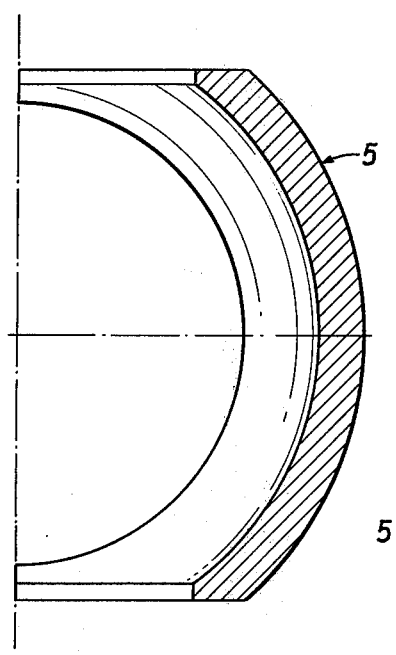
FIG. 3 is a sectional view taken along the line III—III in FIG. 2.

In FIG. 1 a stopcock is shown in cross section consisting of a housing 1 and a plug 4. The housing 1 includes a tubular shell 2 rolled from a strip of sheet metal into a unitary member. Welded to the opposite ends of the tubular shell 2 are ring disk 3 formed from a plane sheet metal blank. The ring disks 3 extend radially inwardly from the tubular sheel 2 forming openings into the stopcock.

Figure 2:
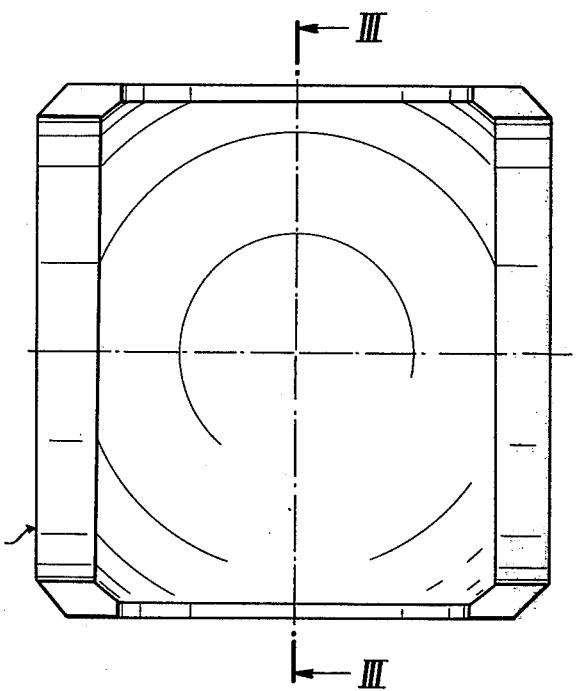
FIG. 2 is an elevational view of a ball-shaped half shell used in forming the plug of the stopcock.

Located in the passage formed through the tubular shell 2 is the plug 4. The plug is constructed of a pair of ball-shaped half shells 5 pressed from a sheet metal blank. A single half shell 5 is illustrated in FIGS. 2 and 3. When assembled together the half shells contain two pairs of oppositely aligned openings, one pair of openings being alignable with the openings through the ring disks 3 for effecting the flow through the stopcock. The other pair of openings in the assembled half shells extend around the axis of rotation of the plug.

An annular disk-shaped core 6 is welded to the half shell 5 in the openings extending around the axis of rotation of the plug. These cores are cut out during the production of the ring disks 3. As viewed in FIG. 1, the upper core 6 forms a support for drive shaft 8 while the lower bore forms a support for bearing journal 7 of the plug. Pipe or sleeve-like members 9 and 10 form the bearings for the shaft and the journal, respectively. The sleeve-like members 9, 10 are welded to the housing shell and each has a radially inner end within the shell and a radially outer end extending outwardly from the shell. Both the journal 7 and the drive shaft 8 are inserted into the bearings from the interior of the plug and each is screwed into its corresponding core 6. Due to this arrangement the radially outer end of the journal 7 is recessed within the sleeve-like member 10 and a cap 11 welded to the radially outer end of the member 10 provides a tightly sealed closure for the journal.

The drive shaft 8 is arranged in the bearing or sleeve-like member 9 with some axial play. As can be seen in FIG. 1, the radially inner end of the bearing, that is, relative to the plug, has a concave spherical surface 12 and the center of curvature of this surface coincides with the center of the ball-shaped plug 4. The surface 12 is spaced slightly outwardly from the outwardly facing surface of the adjacent disk core 6. Positioned between the surface 12 and an annular shoulder formed on the shaft 8 adjacent the outer surface of the core 6 is a metal ring 13. The surface of the metal ring in contact with the concave surface 12 on the end of the sleeve-like member 9 is a convex spherical surface having the same center of curvature as the concave surface. The metal ring 13 tightly encloses the drive shaft 8 and, as mentioned above, bears on the shoulder formed on the shaft. Due to the lifting action of the plug, a good sealing effect is automatically obtained.

Within the ball plug formed by the ball-shaped half shells 5 is a tubular plate 14 extending between the openings provided by the half shells, that is, the openings forming the inlet and outlet to the flow passage through the stopcock. In addition to the openings forming the inlet and outlet to the flow passage through the tubular plate 14, the plate also has another pair of openings which align with the openings through the disk cores 6. As shown is FIG. 1, these openings are tightly closed by plates 15. After the journal 7 and the shaft 8 have been assembled into the bearings 10, 9, respectively, the plates 15 are inserted into the openings.

The housing 1 and the plug 4 are equipped with the usual means for sealing and for connection to a pipe line.

The stopcock formed in accordance with the present invention ensures not only a very economical production of such flow control members but the bearings are arranged closer to the center of the ball-shaped plug than in the usual ball-shaped stopcocks. In this arrangement, the journal bearings for the plug can be tightly sealed from the exterior by welding. The opening to the exterior of bearing 10 is closed by cap 11 welded onto it. The sealing of the drive shaft is achieved in a novel manner, as described above, and is especially effective.

While specific embodiments of the invention have been shown and described in detail to illustrate the application of the inventive principles, it will be understood that the invention may be embodied otherwise without departing from such principles.

In this description the term "sheet metal" refers to metal plates (heavy metal plate) having a thickness range of 0.5 to 8.00 inches.

What is claimed is:

1. Stopcock comprising a welded housing and a ball-shaped plug, said plug including two ball-shaped half shells each pressed from a sheet metal blank, wherein the improvement comprises that said housing includes a sheet metal blank formed into a unitary tubular shell having a pair of opposite open ends with the axis of said tubular shell extending through the open ends, a planar annular ring disk positioned at each open end of said tubular shell with each said ring disk cut from a sheet metal blank and welded around the radially outer circumferential periphery thereof to the open end of said housing at which it is positioned so that each said ring disk forms an opening into the tubular shell for providing a flow of fluid therethrough, said plug having a pair of first apertures formed therethrough, with said first apertures aligned opposite one another and disposed approximately perpendicularly to the axis of said tubular housing, an annular disk-shaped core welded into each of said first apertures, said plug including a drive shaft and a bearing journal in axial alignment with one another and each extending radially outwardly from an opposite side of said plug and each extending through a different one of said disk-shaped cores, said housing having a pair of second apertures aligned opposite one another on opposite sides of said tubular shell and aligned with said first apertures in said plug said ball-shaped half shells having a pair of first openings alignable with the open ends of said housing, an axially extending tubularly shaped first plate having a first pair and a second pair of oppositely disposed axially aligned openings is located within said ball-shaped half shells with the first pair of openings aligned with the pair of first openings formed by said half shells with said tubularly shaped first plate forming a passage for affording flow through said plug between said first pair of openings, the second pair of openings in said first plate being aligned with the first apertures formed by said half shells and providing access for insertion of said shaft and said journal into said bearings during assembly of the stopcock, and a pair of second plates each insertable into a different one of the second pair of openings in said first plate for effecting a tight closure of the second openings.

2. Stopcock, as set forth in claim 1, wherein said journal and said shaft each havng a radially inner end and a radially outer end relative to said plug, said radially inner end of each having a larger diameter than the opening through said core into which said journal and drive shaft are secured so that said journal and drive shaft are inserted through the openings in said core into said bearings from the interior of said plug.

3. Stopcock, as set forth in claim 2, wherein a first sleeve-like member is secured to said housing and has a radially inner end located in said housing and a radially outer end located outwardly from said housing and said first sleeve-like member provides a bearing for said journal, a cap welded to the radially outer end of said first sleeve-like member and forming a sealed closure for said journal and said bearing.

4. Stopcock, as set forth in claim 2, wherein said shaft having an annular shoulder thereon adjacent the outer surface of said core through which said shaft extends, a second sleeve-like member having a radially inner end located within said housing and spaced outwardly from the adjacent said core and from the shoulder on said shaft and forming a bearing for said shaft, the radially inner end of said second sleeve-like member having a concave spherically shaped surface directed toward the adjacent said core, a metal ring located between and in contact with the concave spherically shaped surface on said second sleeve-like member and said shoulder in said shaft, said metal ring having a convex spherically shaped surface thereon in contact with the concave spherically shaped surface on said bearing.

5. Stopcock, as set forth in claim 4, wherein the center of curvature of said concave spherically shaped surface on said second sleeve-like member and of said convex spherically shaped surface on said metal ring coincide with the center of said ball-shaped plug.

6. A method of constructing a stopcock comprising the steps of forming a sheet metal blank into a unitary tubular housing forming an axially extending passageway therethrough having a pair of oppositely disposed open ends extending transverely of the axis of the tubular housing, forming a pair of axially aligned apertures in the tubular housing with the axes of the apertures extending approximately perpendicularly to the axis of said tubular housing, forming a pair of ring disks from a planar sheet metal blank and welding each of the ring disks to the tubular housing in a different one of the open ends so that the ring disks provide a flow opening for the tubular housing, pressing a pair of ball-shaped half shells from a sheet metal blank, assembling the half shells into a ball-shaped plug and providing two pairs of oppositely aligned openings in the plug with one pair being aligned with the openings in the ring disk and the other pair aligned with the apertures in the tubular housing, cutting a disk-shaped core out of each of the ring disks for forming the openings through the disks and cutting an opening through each of the cores, welding each core to the ball-shaped half shells in a different one of the openings therein aligned with the apertures in the tubular housing, inserting a bearing journal in the opening in one of the cores and a drive shaft in the opening in the other one of the cores, placing a sleeve-like member in each of the apertures in the housing with each sleeve-like member having a radially inner end within the housing and a radially outer end positioned outwardly from the housing, placing the bearing journal of the plug into one of the sleeve-like members and the drive shaft of the plug in the other one of the sleeve-like members with the radially outer end of the journal recessed inwardly from the radially outer end of the sleeve-like member, placing a tubular plate through the plug between the openings therein aligned with the open ends in the housing, cutting a pair of openings in the tubular plate aligned with the apertures in the housing and with the openings in the disk-shaped cores, closing the openings in the tubular plate aligned with the apertures in the housing and the openings in the disk-shaped cores after the assembly of the plug with its drive shaft and bearing journals within the housing.

7. A method, as set forth in claim 6, including the steps of providing axial play for the drive shaft of the plug within the corresponding sleeve-like member, providing a concave spherical surface on the radially inner end of the sleeve-like member which receives the drive shaft, spacing the spherical surface slightly outwardly from the outer surface of the adjacent disk-shaped core and seating a metal ring in an annular shoulder encircling the drive shaft so that the metal ring bears against the spherical surface on the sleeve-like member and the shoulder.

* * * * *